United States Patent [19]

Klock et al.

[11] Patent Number: 4,617,643
[45] Date of Patent: Oct. 14, 1986

[54] SYNTAX ERROR CORRECTION METHOD AND APPARATUS

[75] Inventors: Anita H. Klock, Lawndale; Jan B. Chodak, Rancho Palos Verdes, both of Calif.

[73] Assignee: Mattel, Inc., Hawthorne, Calif.

[21] Appl. No.: 437,787

[22] Filed: Oct. 29, 1982

[51] Int. Cl.⁴ .............................. G06F 11/32
[52] U.S. Cl. .................................... 364/900
[58] Field of Search ............... 364/200, 900; 340/715

[56] References Cited

U.S. PATENT DOCUMENTS

| | | | |
|---|---|---|---|
| 3,559,181 | 1/1971 | Carlock et al. | 364/900 |
| 4,198,685 | 4/1980 | Corwin et al. | 364/900 |
| 4,459,678 | 7/1984 | McCaskill et al. | 364/900 |

FOREIGN PATENT DOCUMENTS

0023486  2/1980  Japan ................................. 340/715

*Primary Examiner*—Gareth D. Shaw
*Assistant Examiner*—John Salotto
*Attorney, Agent, or Firm*—Ronald M. Goldman; Melvin A. Klein; Daniel F. Sullivan

[57] ABSTRACT

A digital computer system in which a series of programming series are processed and in which the structure of the programming statements must conform of a predetermined set of syntax criteria to permit processing. A programming statement is compiled in response to a computer input and displayed. The structure of the statement is examined in accordance with a predetermined statement of syntax rules. On the display selected color indicia are assigned to each character within the statement when it is in accordance with a predetermined set of syntax rules. The computer processor determines whether any characters remain to which color indicia have not been assigned and designates the statement as either acceptable or unacceptable by providing different color indicia bearing characters. In addition, the system includes a method of overlooking syntax errors to reduce operator frustration during running.

8 Claims, 10 Drawing Figures

THE FOLLOWING ITEMS ARE COLORED:

| | |
|---|---|
| VARIABLES | 2200 BLACK ON GREEN |
| CONSTANTS | 3400 BLACK ON YEL. GREEN |
| FUNCTIONS | 3000 BLACK ON PINK |
| DELIMETERS | 1400 BLACK ON ORANGE |
| ROUTINE NAMES | 0003 GREEN ON BLACK |
| OPERATORS | 0600 BLACK ON TAN |
| COMPARISON OPERATORS | 1200 BLACK ON CYAN |
| STATEMENT TOKENS | 3200 BLACK ON LT BLUE |
| LITERAL STRINGS | BLUE ON WHITE |

SYNTAX ERROR CORRECTION METHOD AND APPARATUS

BACKGROUND OF THE INVENTION

This invention relates generally to computer systems and particularly to those characterized as personal computers, and more particularly to those used most frequently by persons having little or no previous experience at programming a digital computer.

Personal computers have become increasingly popular primarily with the advent and availability of low cost processing units such as those utilizing a microprocessor or micro-computer. Such systems vary in structure greatly, but all may be said to contain the common elements of a central processing unit, a keyboard, a display device, and memory associated with the processor. In the majority, if not all, personal computers of the type which the present invention is most advantageous, the central processing unit comprises a microprocessor which has associated with it a memory in which the programming logic of the particular computer language under use is stored together with a sufficient amount of temporary or scratch pad memory in which a processor may temporarily store information to facilitate its processing. The keyboard unit most typically comprises a plurality of alpha-numeric keys generally arranged substantially in accordance with standard typewriter key configurations, but most often including additional keys for switches to facilitate the peculiarities for particular demands of computer programming. The display device most frequently used in present day microprocessor based computers is a cathode ray tube device in which alpha-numeric characters being processed or otherwise related to the programming processed are portrayed on the CRT display screen. In recent years, due largely to cost and convenience factors, many personal computers have been designed for interaction with a convention color television receiver. This, of course, greatly reduces the costs associated with the computer. In such systems, the basic personal computer has included in place of a display device dedicated to the unit a system for modulating the to-be-displayed information upon an available picture carrier in accordance with standard TV broadcast signal construction, whereby the to-be-displayed information is passed to the antenna input for the television receiver.

While a large number of programming languages which facilitate the interaction between the user and the processor of the computer have been devised to suit various needs, the basic process of programming is essentially the presentation of an ordered set of instructions and/or requests to the computer processor by the user which are fashioned in an appropriate language sequence understandable or interpretable by the computer processor and which set up the user's instructions and request to the processor to achieve the end result. By way of simple example, the user may request the computer to solve a particular equation by first stating the equation to the processor, second stating the known values for several of the variable in the equation, and then third request the computer to solve the equation and display the correct number or numbers which correspond to the value of the desired variable.

It is essential, regardless of whether the program being implemented or constructed, is as simple as the foregoing example or much more complex that each instructed presented to the processor be in a form which facilitates the correct communication to the processor. This aspect of programming is one of the most difficult areas for persons having little or only beginner experience with computer programming who desire the right programs for a computer. The majority of errors in information presentation for statement writing, experienced by programmers, are those referred to in the art as errors of syntax and mean in essence a statement has been presented to the computer in a manner which the processor cannot properly interpret. Such syntax errors and the need indeed the insistence of a processor upon a properly syntaxed statement before processing can proceed often result in the appearance of great complicity of operation for the novice and similarly often result in totally frustrating efforts of the beginner and experiencing computer programming.

The problems associated with beginner or novice operation or attempts to program or write programs for a personal computer are of particular concern for manufacturers of low-cost computer devices which with limited resources are designed primarily to be purchased by and used by persons having little or no experience in programming. Recognizing the difficulties of introducing such persons to computer programming and therefore creating consumer acceptance of their product, such manufactures have endeavored to reduce operator complications and frustrations associated with syntax requirements for program writing. For example, many personal computers when confronted with an incorrect statement or command during programming, provide some sort of indication that a syntax error exists in the statement, further some prior art systems in addition provide some indicia of the type of error most often in the form of an error number which permits the operator to consult a look-up table and find the discription of that type of error together with instructions as to how to correct to existing syntax error.

While such systems do provide some help in beginner operation of programmable computers, there remains a need in the art for a simple, easy to use system for communicating the nature and quality of syntax errors to the user. In addition, there remains a need in the art to facilitate the user's interaction with the processor in a manner whereby insignificant errors may be ignored by the processor unit.

Accordingly, it is an object of the present invention to provide a method and structure which facilitates the communication of syntax errors to the user. It is a more particular object of the present invention system to provide a method and structure whereby a maximum of information as to the nature and quality as well as corrective measures for a presented syntax error be communicated to the user without use of external look-up tables and sources of information.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the several figures of which like reference numerals identify like elements, and in which:

DESCRIPTION OF THE PREFERRED EMBODIMENT

Figure 1:
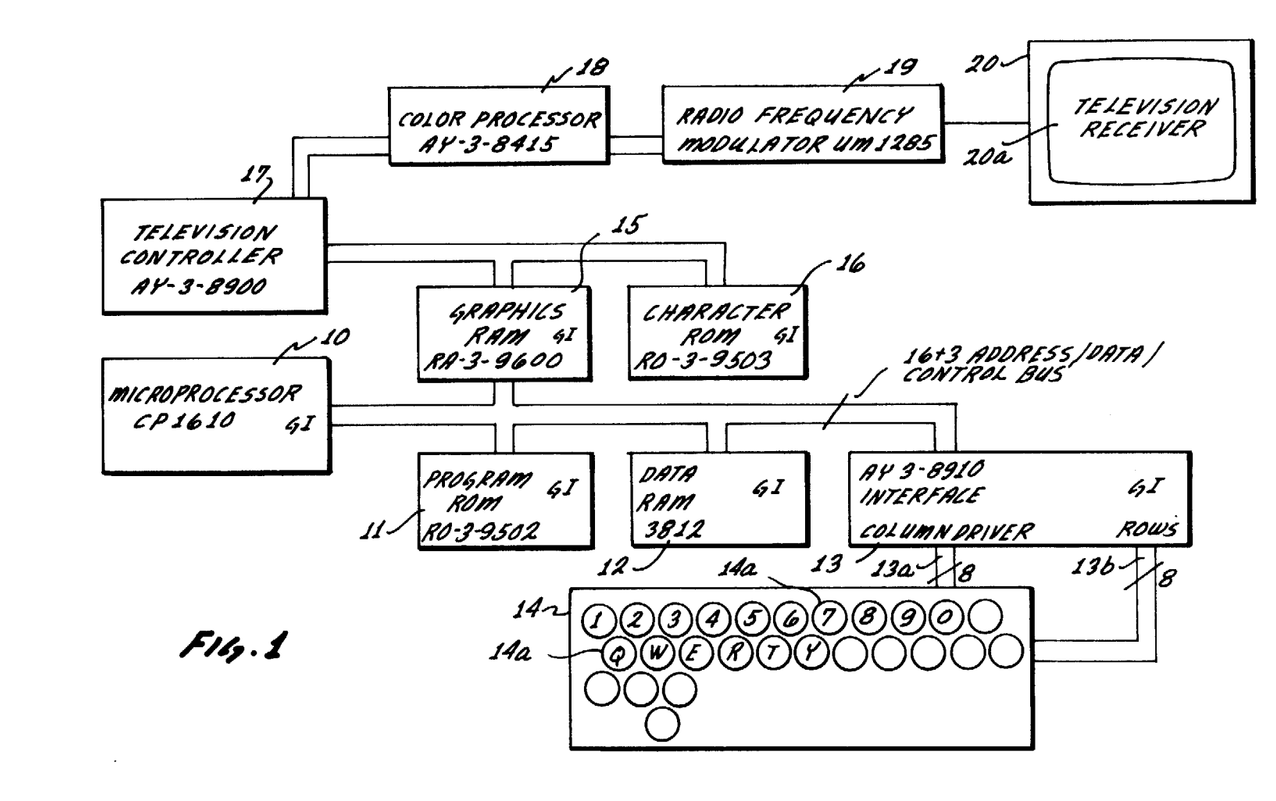
FIG. 1 is a block diagram in accordance with the present invention system.

FIG. 1 sets forth a block diagram of the present invention system in which a microprocessor 10 is coupled to a program ROM 11, a data ROM 12, a graphics ROM 15, and to a sound processor and column and row driver 13. A keyboard 14 is coupled to the column and row driver portion of sound processor 13. A television controller 17 is coupled to a character ROM 16 and to graphics RAM 15. Television controller 17 is further coupled to a color processor 18 which in turn is coupled to a radio frequency modulator 19, the output of which is coupled to a television receiver 20.

It should be understood that the block diagram depiction in FIG. 1 represents a signal flow diagram and shall be understood that in accordance with well-known practices within the art that each functional block represented in FIG. 1 is in fact representative of one or more electronic devices or integrated circuits together with appropriate interconnections to appropriate electrical power supply sources of interconnected ground potential and that the interconnecting "lines" are intended to depict multiple electrical connections for communicating multi-bit digital information between the respective functional blocks shown.

Processor 10 includes conventional circuitry for carrying forth the central processing unit functions of a digital computer including a processor unit such as a microprocessor chip which may for example comprise a CP1610 microprocessor manufactured by General Instruments Corporation. Processor 10 interacts with program ROM 11 which may for example be a General Instruments' device no. RO-3-9502 and a data RAM 12 which may for example comprise General Instruments' device no. 3812. Program ROM 11 provides the basic program instruction and logic control for processor 10 whereby the logical steps required for program implementation are carried forth in accordance with conventional digital computer processing techniques. Data RAM 12 functions as a "scratch pad" memory system for processor 10 and provides among other functions a temporary storage location group which may be used by processor 10 to accumulate information during program computations and so forth. Interface device 13 include a plurality of communication lines 13a which are coupled to the column signal outputs of keyboard 14 in accordance with conventional digital computer. Similarly, interface device 13 includes a plurality of row signal lines 13b which are coupled to corresponding output terminals on keyboard 14.

In operation and in a manner to be described below in greater detail in the accompanying figures depicting the flow charts for the present invention system, processor 10 receives the operator input due to switch connections established on keyboard 14 and the communication via interface device 13 to the input of processor 10 whereby the operator communicates to processor 10 a program instruction input or command. In response to user input via keyboard 14, processor 10 in accordance with the stored set of instructions in ROM 11 performs the required information processing in most instances with the aid of interaction with data RAM 12 and produces appropiate output signals which when applied to graphics RAM 15 and thereby to television controller 17 will cause color processor 18 to output character signals to radio frequency modulator 19. The receive signal by radio frequency modulator 19 are imposed upon an appropriate television carrier signal in accordance with the television broadcast standards of television receiver 20 and are coupled to the radio frequency input (not shown) of television receiver 20.

In accordance with an important aspect of the present invention, each instruction received by processor 10 from keyboard 14 via interface device 13 is examined in a prescribed manner and in accordance with the information processing sequence described below in greater detail to determine the manner in which the received message is to be responded to by processor 10. As each character key 14a on keyboard 14 is pressed by the user, processor 18 in addition to receiving that character for use in information processing causes television controller 17 to have applied thereto the appropriate signal for producing that particular character. The information present in such a character signal includes the nature of the character itself, that is a "1" or "A" or "X" or any other character having a key assigned thereto on keyboard 14 which in essence means any character within the character list of the Ascii character set presently used in computer technology, together with the color of the character and the corresponding background color associated therewith. As a result, as each character key 14a of keyboard 14 is despressed by the user, the character will appear on the display screen 20a of television receiver 20 and will be inputted to processor 10 for use in program control. In accordance with an important aspect of the present invention, as each key is initially pressed the character appears immediately upon screen 20a in a simple black on white format. Once the user has completed a program statement or step as evidence by the pressing of carriage return on keyboard 14, processor 10 in accordance with the program stored in ROM 11 performs a syntax correctness examination of the offered statement or instruction. The statement examination is described below in greater detail in connection with the flow charts of FIGS. 3 through 7 and will be described therein. Suffice it to say here, however, that the syntax examination is carried forth in which processor 16 applies a pre-determined hierarchy of interpretation rules to the offered statement or instruction. The results of this analysis of processor 10 of the offered statement or instruction as to syntax correctness are communicated to the operator by applying a pre-determined color code to each character present on the line of the display under examination. Any character whose position or presence does not conform to accepted syntax is displayed without colored indicia. All characters which are determined by processor 10's analysis to be in conformity with accepted syntax are displayed with an appropriate color indicia. In the event that syntax is correct, the statement is displayed with all characters appropriately color coded or bearing appropriate color indica and the operator is free to enter the next programming step. In the event that syntax is not correct, processor 10 implements a separate interpretation in which a pre-determined set of interpretation rules described below in conjunction with the accompanying flow charts is carried forth and an attempt is made by processor 10 to arrive at an acceptable interpretation of the statement.

As a result of such further analysis and in the event an appropriate interpretation conforming to correct syntax can be assumed, the offered statement is displayed varying appropriate color indicia for all understood characters and an indication by the absence of color indicia of characters which are in essence ignored by processor 10. This permits the operator to concur with the computer's understanding of the offered statement notwithstanding the apparent error in the statement and to carry forth the program. In the event that the second evaluation of the offered statement results nonetheless in a non-syntax conformable statement, the display of the statement is altered to depict all previously color statements, that is all statements previously bearing a color indicia to a grey background indicating that the syntax of the statement offered is unacceptable. Because the indicia of previously colored and therefore comprehendable character remains in the color indicia and those characters non understood or comprehended by the processor remain grey, the operator is made aware of the appropriate character elimination or removal to be carried forward to correct the statement.

Figure 2A:
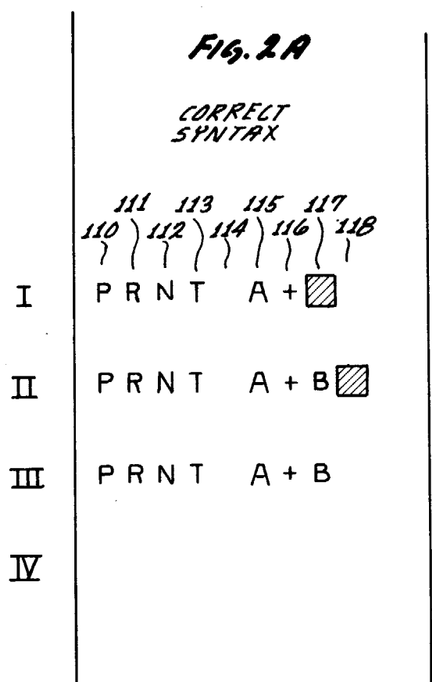
FIGS. 2A through 2C is a display diagram in accordance with the present invention system.
Figure 2B:
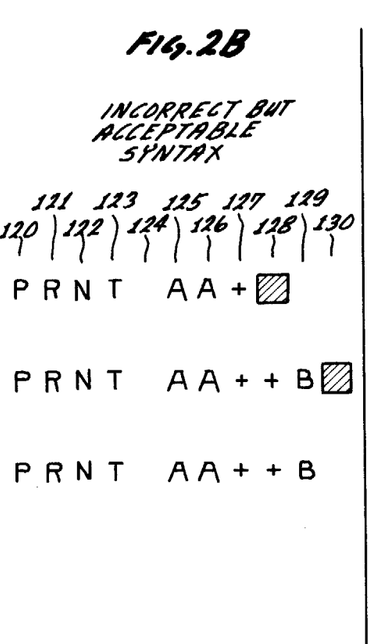
Figure 2C:
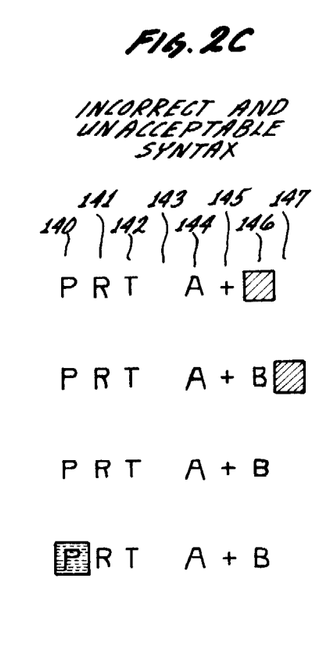

FIGS. 2A through 2C depict example consequences of the attempt to input the statement "PRNT A+B". FIG. 2A depicts the sequence of events in which the statement is correctly constructed by the user and conforms to the acceptable syntax of the programming language. FIG. 2B depicts the resulting situation as seen on display 20A of television 20 when an erroneous syntax statement is applied which although incorrect is capable of machine interpretation by alternative analysis in accordance with the present invention. FIG. 2C depicts the sequence of events when an erroneous attempt to input the above statement is both incorrect and not capable of usable interpretation under alternative analysis of the present invention system.

In accordance with conventional digital computer display techniques, each character when displayed in response to a corresponding character key depression on keyboard 14 is placed in an assigned character space or cell on the display. In other words, display screen 20A is organized in a plurality of character spaces arranged in rows across display 20A. For example, in FIG. 2A and assuming the attempted statement depicted in the line marked Roman Numeral I, it will be apparent that the cursor shown in line Roman Numeral I at position 117 is sequentially moved as each character is placed in display segments 110 through 116 preceeding. For example, at the beginning of print, the cursor would be displayed in cell 110, upon depression of the key corresponding to the character key on keyboard 14, the cursor would move to segment 111 and a letter P in black upon a white cell background at 110 would appear. Similarly as each of the letters R N T are pressed, the cursor would move through sequence of cells 111 through 113 leaving behind the letter R N T displayed as shown as black letters on a white background. Cell 114 resulted from depression of the key corresponding to space and similarly the A and plus signed displayed at cells 115 and 116 respectively of line Roman Numeral I resulted from the sequential pressing of the character key A and plus sign. Cell 117 is shown with the cursor occupying the cell in which the final operation of pressing the B character key is required to input the statement PRNT A+B. The line labeled Roman Numeral II of FIG. 2A shows the display once all characters have been correctly applied and the cursor occupies cell 118, that is the statement has been correctly inputted but the carriage return has not yet been pressed. At this time, the entire statement appears as each character shown as black over a white background. Line Roman Numeral III shows the display line once the carriage return has been initiated. As will be described below in greater detail, the application of carriage return initiates the syntax analysis of the present invention system. Accordingly, the situation shown in line Roman Numeral III depicts the letters PRNT now displayed in black upon a blue background which is the color indicia assigned to a recognized command statement or "token statement". Similarly, letters A and B occupying cells 115 and 117, respectively, appear as black characters on green background in accordance with the assignment of such color indicia to a variable. Finally, the plus sign appearing in cell 116 is displayed with the color indicia of black on tan. The situation then shown in Roman Numeral III line of FIG. 2A communicates to the operator that a proper statement with correct syntax has been entered into the program, the operator is then free to proceed with succeeding statements of the program with the assurance that the computer understands and is processing the statement shown.

FIG. 2B shows the same sequence of lines I, II, and III in which an error of a type, although erroneous, is capable of alternate interpretation in the present invention system and will result in the correct input to the computer just as though the operation or command had been correctly typed as shown in FIG. 2A. Again, the attempt is to input the statement shown above, however, while cells 120 through 124 correctly depict the letters PRNT and cell 125 shows the variable A, cell 126 has incorrectly been typed with a second A and cell 127 has a positive or plus sign appearing in it while cursor appears in cell 128. As in the case of FIG. 2A, at this point, all characters will appear as black characters over white backgrounds. Line II in FIG. 2B shows the completed typing of an erroneous statement in which a double variable A at cell 126 error and a double plus sign at cell 128 has appear prior to carriage return. Again in correspondence with the situation depicted in FIG. 2A all characters at this point, that is prior to carriage return appear black upon white background. Line III in FIG. 2B depicts the line after carriage return has been initiated which as mentioned brings forth the analysis of syntax. The situation depicted in III of FIG. 2B shows the result of alternate analysis upon the incorrectly inputted line. The letters PRNT in cells 120 through 123 again appears in "correct" indicia as shown in FIG. 2A that is black characters on blue backgrounds indicating the computer has correctly understood the inpputed token PRNT. Similarly, the first encounter A in cell 124 is correctly interpreted by the computer as variable and therefore appears again with the color indicia black on a green background. However, the second letter A appearing in cell 126 is not capable of correct syntax interpretation and therefore remains as a black character on a white background indicting to the operator that it has not been regarded as a correct character. Similarly, the plus sign in cell 127 conforms with correct syntax and therefore bears the correct color indicia of a black character on a tan background, however, the second plus sign in cell 128 again appears black over a white background indicating an incorrect character. Finally, the letter B appearing in cell 129 is correctly interpreted by the syntax analysis of the computer and is therefore displayed with the color indicia of the variable that is black character on a green background. Since the characters bearing the correct color indicia to the exclusion of the non-color indicia bearing characters taken together comprise a correct input in comformity with syntax requirements of the desired statement, the user can upon examination upon line III of FIG. 2B determine that the step may be implemented in furtherance of the desired program. In accordance with an important aspect of the present invention, the processor under program control will assemble only those characters which are correctly color indicia coded and will exclude those characters not bearing color indicia ie the second letter A and second plus sign and will carry forth processing as though the statement had been correctly inputed initially. This provides considerable "tolerance" of the system to novice programmers and greatly minimizes the frustrations of achieving correct syntax by such persons. However, because there appears the present invention color indicia of the functional interpretation of the statement offered as well as an indication of incorrect characters. The programming techniques and syntax construction are appressed upon the operator, but the frustration level is greatly reduced because the processor carries forward the program using the correct syntax achieved under the alternate analysis. It will be apparent to those skilled in the art that this carrying forward of the program and color indicia of syntax structure interpreted by the machine represent a considerable advantage over prior art systems by facilitating in a single display the interpretation that the computer has applied in analysing syntax as well as the characters which have caused difficulties in the statement and therefore produce the errors in syntax together with indicia of the resulting instruction to the processing unit achieved by the statement.

FIG. 2C sets forth a similar sequence of events to those depicted in FIGS. 2A and 2B in which however, an error in syntax in the statement applied is of a nature not capable of successful alternate interpretation by the processor. Line I in FIGS. 2C shows the input of characters in cells 140 through 145 inclusive with the cursor resting in cell 146 preparitory to applying the character B. However, examination of cells 140 through 142 shows that an error has been made in inputting the token symbol group PRNT has appeared instead as "PRT". Line II shows the erroneous statement as displayed prior to the initiation of carriage return. As is the case in lines I and II in FIGS. 2A and 2B, in FIG. 2C the characters appear as black characters upon white backgrounds. Again, similar to previous instances in FIGS. 2A and 2B, line III depicts the resulting display after carriage return has initiated the syntax analysis of the present invention system. As will be understood below in greater debth in connection with the accompanying flow charts in FIGS. 3 through 7, the situation display in response to the input shown in FIG. 2C and displayed in line III is the result of failure by both correct syntax analysis and alternate syntax analysis to achieve a recognizeable instruction or command. That is to say, the processor has recognized the letter P in cell 140 as a variable but does not recognize the symbol group PRT as an assigned symbol group or token. In response to that and in contrast to the situation in FIG. 2B, the present invention system then initiated an analysis in which it attempts to interpret the input command as an assignment statement, that is a simple mathematical statement. However, the statement shown is incorrect under that interpretation also because the processor cannot recognize the juxtoposition of the letters PNR nor for that matter RNT as juxtoposed variables without an innerspersed operator. Accordingly, the system displays the line shown in FIG. 2A as III in which only the initial character P may be assigned a color indicia of black on green indicating its interpretation as a variable. The remaining statement appears as characters black on white indicating no machine interpretation can be achieved. Accordingly, the system cannot process the statement which is attempted to be applied. Therefore, line IV of FIG. 2C shows a further modification of the syntax indicia of the present invention system in which all previously color (that is machine interpretable) characters appear on grey shaded backgrounds as shown in cell 140 of line IV of FIG. 2C. The appearance of grey shading rather than color indicia informs the operator that the statement is not capable of alternate interpretation and will, in effect, be ignored by the computer. This, of course, causes the operator to again attempt analysis and correction of the statement attempted to be applied.

FIGS. 3 through 7 set forth the flow chart whereby the present invention system of syntax error analysis is carried forward. At the outset, it should be apparent to practitioners in the art that the following flow chart depicts one embodiment of the present invention, and that other flow charts and organizations for achieving the same objectives and for practicing the present invention can be constructed by those skilled in the art. It shall be further apparent to those skilled in the art that numerous computer programs using different program languages and program techniques may be carried forward to implement the present invention as depicted in FIGS. 3 through 8 without departing from the spirit and scope of the present invention.

Figure 3:
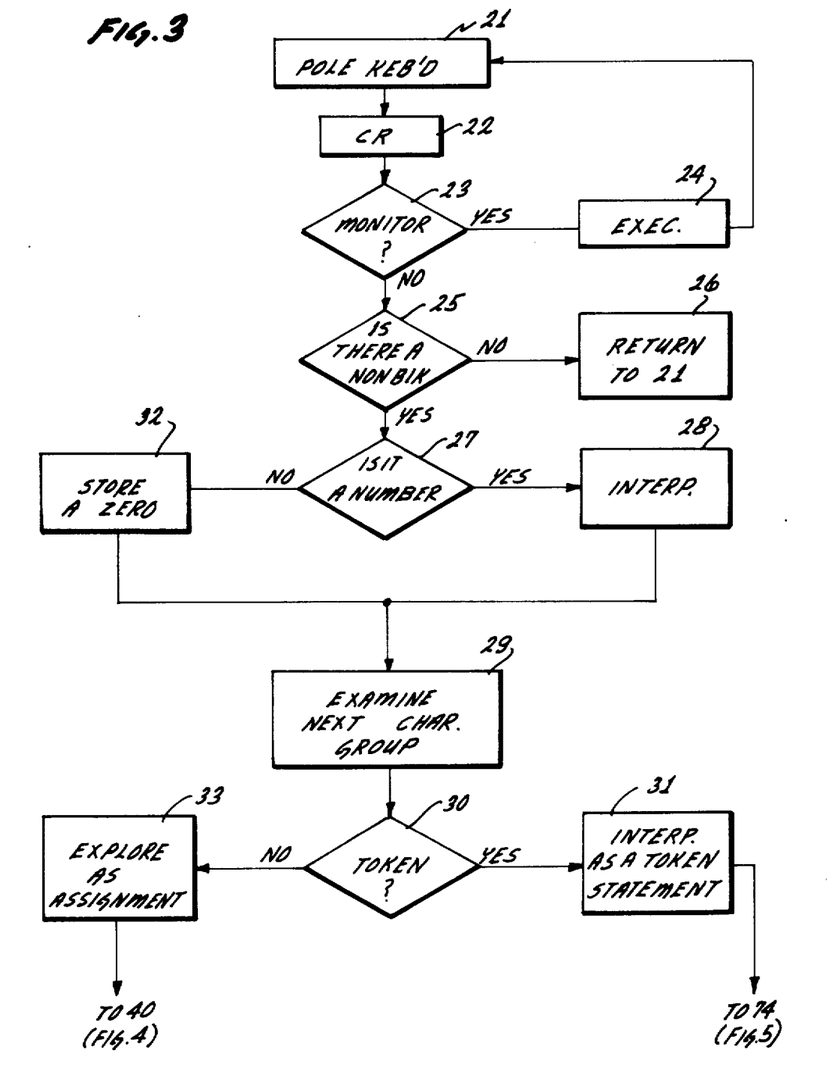
FIGS. 3 through 7 are flow charts in accordance with the present invention system.
Figure 4:
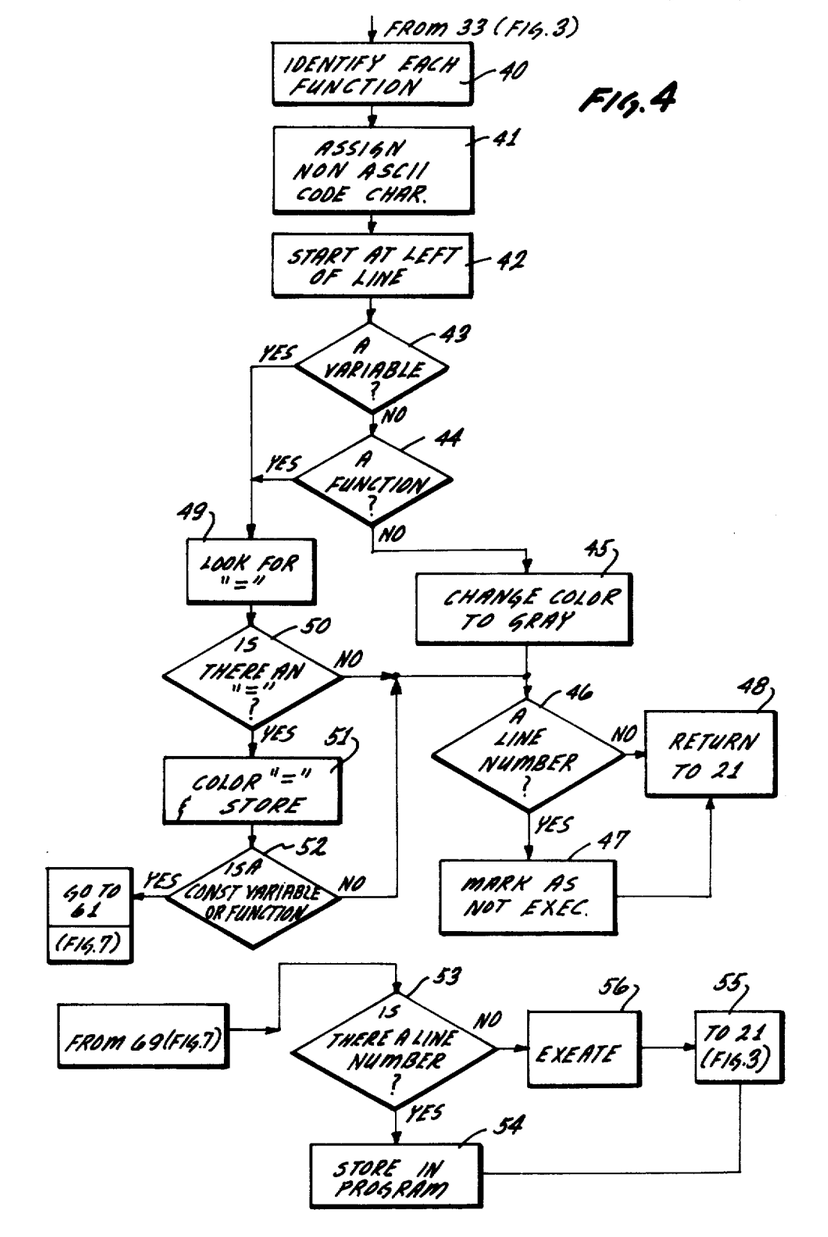
Figure 5:
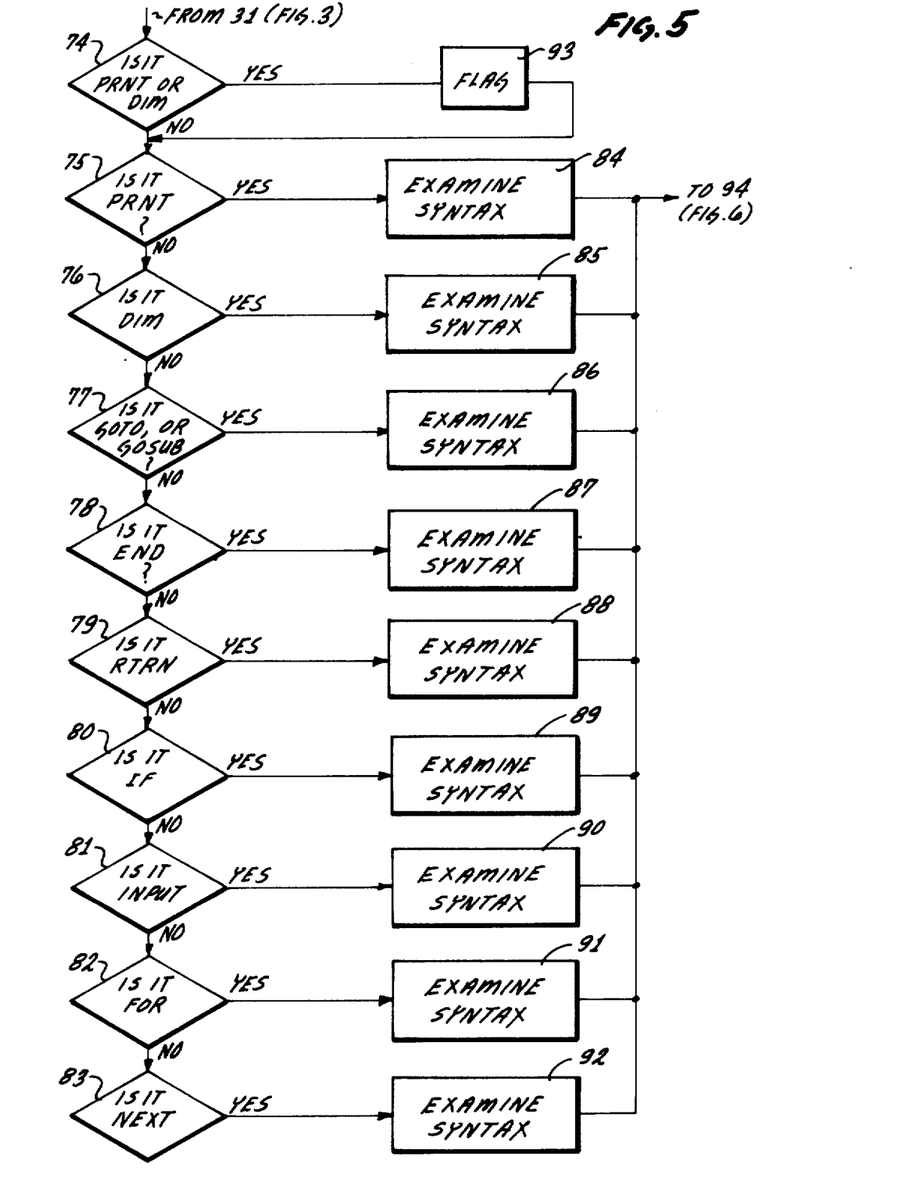

Turning initially to FIG. 3, a keyboard pole step 21 in which the processor of the present invention is ready to accept the next character input from keyboard 14 is shown in which a succession of keys are depressed by the operator on keyboard 14 to input a plurality of characters as shown for example in FIGS. 2A through 2C. As is also shown therein, the program upon implementation of a carriage return moves to a step 22 in which the carriage return is received. Thereafter, the program moves to a monitor inquiry 23 in which an inquiry is made as to whether a selected one of several commands are called forth which do not require syntax examination. For example, commands to clear the register or clear the display line or to simply list the display line, when indicated by the proper character grouping do not require syntax examination, but simply initiate that particular request. In the event a monitor command is present, the program moves out the affirmative branch of step 23 to step 24 in which execution of the required command apart from any syntax examination is carried forward. Thereafter, the program returns to keyboard polling step 21. In the absence of a monitor command, the program moves to a step 25 in which it is determined whether a character is present or not. If no character is present, the program moves through the negative branch of step 25 to step 26 in which a return to keyboard poll step 21 is carried forward. If affirmative, at step 25, that is a character is present, the program moves to a decision step 27 in which a determination is made as to whether the initial character encountered is a numeric digit, if no, the program moves to step 32 in which a zero is substituted for the line number and the system is made aware of an immediate execution step to follow. Thereafter, the program moves to step 29 in which the character groups are examined. Returning to step 27 in the event an affirmative result is obtained, that is a numeric digit is present, the program moves to a step 28 in which an interpretation that the number is a line number is carried forward and the appropriate color corresponding to a line number is assigned to the characters comprising the number. Thereafter the program moves to step 29. In step 29, after examination of the character group for the presence of a token statement (that is a character symbol group which has special meaning to the processor) is carried forward in step 30. If an affirmative determination of the presence of a token statement is found in step 30, the program moves to step 31 in FIG. 5, if not, the program moves to step 33 in which an interpretation of the statement as an assignment statement is carried forward in accordance with the steps shown in FIG. 4. The interpretation that a token statement is present in step 30 of FIG. 3 causes the program to move to step 31 in FIG. 5 which institutes a step 74 in which a determination is made as to whether a print or DIM statement is present. If affirmative, the program moves to a step 93 in which a flag as to that function character is assigned and from step 93 the program moves to step 75. If a negative indication is found in step 74, the program moves directly to step 75. Steps 75 through 83 provide sequential examination of the token statement to determine which token statement is present. For example, in step 75 a determination is made as to whether the token statement is a print statement, if yes, the program moves to a syntax examination or a print statement and the color indicia for a token statement is assigned. If not a print statement, the program moves to step 76 in which it is determined whether a DIM token statement is present. If yes, the program moves to a step 85 in which an examination is made in accordance with the DIM syntax rules to determine whether the statement is a correct DIM statement. Similarly, the successive decision steps 77 through 83 carry forth a branching of the program in which the statement is analyzed to determine which token statement is present and in response to the determination of a particular token statement, the selected one of syntax examination format 86 through 92 are carried forward. While any number of token statements may be assigned and in the present case, token statement analysis are found for statement for statements of PRINT, DIM, GO TO, GO SUB, END, RTRN, IF, INPUT, FOR, NEXT, it will be apparent to those skilled in the art that any number of additional token statements that is special meaning statements may be created and used in the program language. And in order to practice the present invention system, there need only be an appropriate step in the flow chart shown in which examination is made for the presence of that particular programming token statement and the branching of the program upon determination of its presence to a step which initiates the examination of that statement using the appropriate syntax examination formula. In accordance with an important aspect of the present invention, each token statement syntax examination step 84 through 92 includes a determination whether all necessary elements have been fulfilled in the statement under analysis. Conversely, some criteria of the syntax of any given token statement may be assigned an optional character. The importance of the optional verses necessary character of such component of syntax will be apparent in examination of the following Figure. Suffice it to say here that it plays an important roll in the aspect of the present invention system by which syntax errors may be overlooked or ignored in order to achieve a functioning statement and carried forward with the program.

Figure 6:
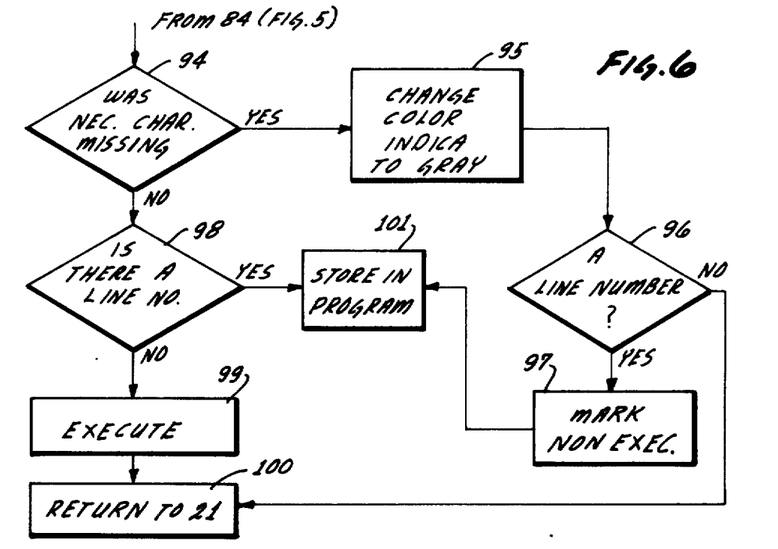
Figure 7:
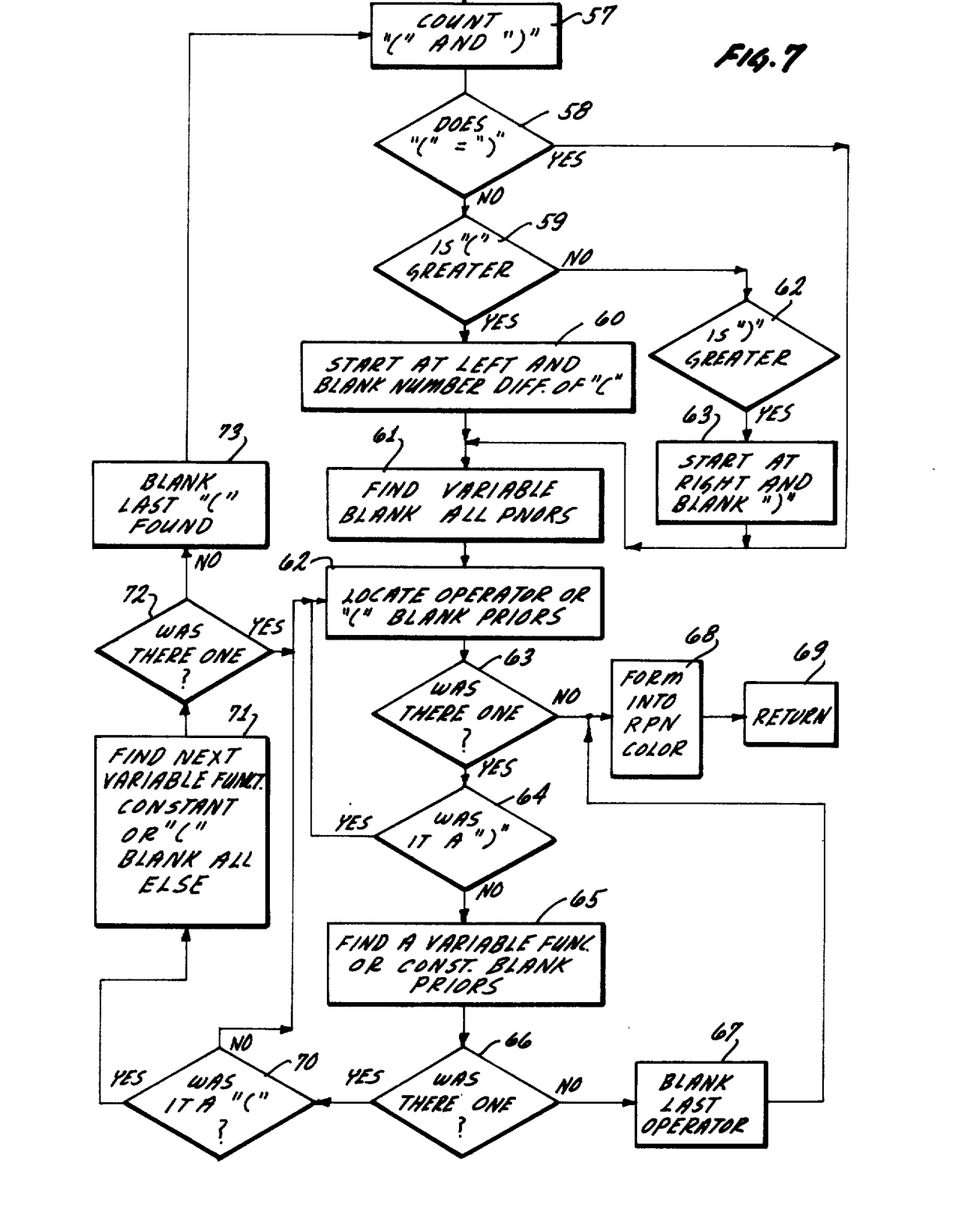
Figure 8:
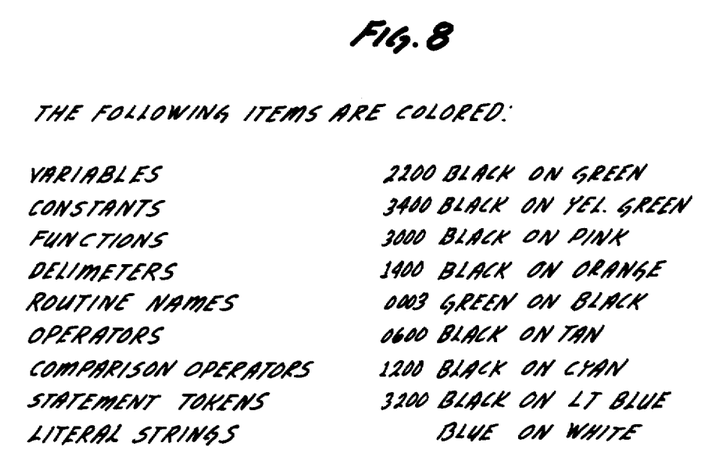
FIG. 8 is a color chart in accordance with the present invention system.

After the appropriate one of steps 84 through 92, the program returns in each instance after syntax examination to step 94 in FIG. 6 in which a determination is made as to whether any necessary element is missing in the examined statement. If a necessary element is missing, the program branches to step 95 in which every previously colored element is transformed to a character displayed upon a grey shaded background. Thereafter, the program moves to a step 96 in which a determination is made as to whether there is a line number. If there is no line number, the program moves to a return step 100 and from there to keyboard scan step 21. If a line number is present, it is designated internally for the processors interpretation as a non-executable statement. This tells the processing unit that this step is not to be executed in the program. In other words, the fatal syntax error of the type found in FIG. 2C has been discovered and the display is colored grey at all previously color indicated characters and the processor is told to ignore that step. Returning to step 94 in the event that no necessary element is found missing, the program moves to a step 98 in which a determination is made as to whether there is a line number. If there is a line number, the program moves to a step 101 in which the statement is stored as part of the basic program in the computer's memory. If no line number is present, the program moves to a step 99 in which the statement is carried forth or executed and thereafter, returns to keyboard scan 21 via return step 100.

Returning now to step 30 in FIG. 5 in which a determination is made as to whether the statement includes a token statement or symbol group. If no token statement is present, the program moves to a step 33 in which it is indiciated that an assignment statement analysis will be carried forward and from there to step 40 in FIG. 4 in which each function is identified in the statement. As used herein, the term function is more restricted in meaning to that normally assigned in mathematics in that it is restricted to specific operation within the processor. For example, the function "SET" directs the processor to assign a value following the word SET to a particular variable. Similarly, the function "FETCH"0 directs the processor to call the present value of the named variable in the function. And finally by way of additional example, the function "CO" directs the processor to determine the present color assigned to a particular binary word. In step 40, the particular function in the statement is identified and the program moves to a step 41 in which a special character for internal use only which is not a character found on the keyboard but is drawn from a separate character library is substituted for the function in all further processing. Thereafter, the program moves to a step 42 in which the examination returns to the beginning of a statement line thereafter the program moves to a step 43 in which it is determined whether or not there is a variable present in the statement. If YES, the program moves to step 49. If not, the program moves to step 44 in which it is determined whether or not there is a function present. If a function is present, the program again moves to step 49. If not, the program moves to step 45. In step 45 each previously colored character is displayed against a grey background, thereafter the program moves to a step 46 in which a determination is made as to whether there is a line number. If no line number is present, the program returns via step 48 to keyboard scan step 21. If a line number is present, the program moves to a step 47 in which the statement is designated as non-executable and will be ignored by the program. Return to step 49 at the affirmative output of either steps 43 or 44, the statement is examined for an equal sign and all other characters are ignored. Thereafter the program moves to a determination step 50 in which it is determined whether an equal sign is present. If no equal sign is present, the program moves to step 46 if an equal sign is present the program moves to step 51 in which the appropriate color indicia for the equal sign character is assigned and the equal sign is stored. Thereafter, the program moves to step 52 in which a determination is made as to whether a constant variable or function is present after the equal sign. If an affirmative determination is made, the program moves to step 57 in FIG. 7 in which the number of parenthesis opens that is left hand parenthesis are present and the number of closed perenthesis or right hand parenthesis are present. Thereafter, the program moves to a step 58 in which it is determined whether the left hand and right hand parenthesis are equal, if YES, the program moves to a step 61, if not, the program moves to a step 59 in which inquiry is made as to whether the left parenthesis exceed the right parenthesis. If YES, the program moves to a step 60 in which beginning at the left most stide of the statement, the open parenthesis are blanked from left to right in the number equal to the difference between left and right parenthesis, thereafter the program moves to step 61. In the event the left parenthesis number does not exceed the right parenthesis number the program moves to a step 63 in which the beginning at the extreme right of the statement, the right parenthesis are serially blanked in a number equal to the difference between left and right parenthesis. Thereafter, the program returns to step 61. At step 61, the program locates the variable or constant in the statement and blanks everything preceding it and thereafter the program moves to step 62 in which it locates an operator or close parenthesis blanking everything before it. Therafter, the program moves to step 63 in which a determination is made as to whether there is a right parenthesis or an operator. If not, the program moves to a step 68 in which the statement is interpreted as syntactically correct and translated into appropriate notation known in the art as RPN for processing in the appropriate order algebraically. In addition, the display is caused to display constants, variables, functions and operators with the appropriate color indicia. Returning to step 63, if a right parenthesis or an operator is present, the program moves to step 64 which a determination is made as to whether it was a right parenthesis. If so, the program returns to step 62, if not, the program moves to step 65 in which it examines the statement to find a variable function or constant or open parenthesis blanking everything before it. Thereafter, the program moves to step 66 in which a determination is made as to whether any of the thought elements in step 65 are present, if not, the program moves to a step 67 in which the last operator is blanked and thereafter the program returns to step 68. If one of the items sought in step 65 is present, the present moves to a step 70 in which a determination is made as to whether the sought element in step 65 which was found was a open parenthesis. If not, the program returns to step 62, if so, the program moves to a step 71 in which a statement is examined to find the next variable function constant or open parenthesis blanking everything not so designatable. Thereafter, the program moves to a step 72 in which a determination is made as to whether one of the items sought in step 71 is present. If yes, the program returns to step 62. If not, the program moves to step 73 wherein the last open parenthesis found is blanked and the program returns to step 57.

While particular embodiments of the invention have been shown and described, it will be obvious to those skilled in the art that changes and modifications may be made without departing from the invention in its broader aspects and therefore the aim in the impended claims is to cover all such changes and modifications as fall within the true spirit and scope of the invention.

We claim:

1. For use in a digital computer in which a series of programming statements are processed, and in which the structure of programming statements must conform to a predetermined set of syntax criteria to permit processing, a method of syntax examination and correction comprising the steps of:

compiling a programming statement in response to user input;

displaying said programming statement;

examining the structure of said statement in accordance with a predetermined set of syntax rules;

displaying selected color indicia of each character within said statement which is in accordance with said predetermined set of syntax rules;

determining whether any characters remain to which color indicia have not been assigned;

examining the color indicia bearing characters alone in accordance with said set of syntax rules and designating said statement as acceptable or unacceptable, and, if designated acceptable, entering an altered programming statement thereof into the program formed solely of color indicia bearing characters.

2. The method set forth in claim 1 further including the step of:

if said statement is designated as unacceptable displaying said statement in a manner wherein all color indicia bearing characters bear a common visual designation.

3. The method set forth in claim 2 wherein the visual designation is a gray shaded background surrounding the character.

4. The method set forth in claim 1 wherein the color indicia is a predetermining color background surrounding the character.

5. For use in a digital computer in which a series of programming statements are processed, and in which the structure of programming statements must conform to a predetermined set of syntax criteria to permit processing, syntax examination and correction means comprising:

means compiling a programming statement in response to user input,     means displaying said programming statement;

means examining the structure of said statement in accordance with a predetermined set of syntax rules;

means displaying selected color indicia of each character within said statement which is in accordance with said predetermined set of syntax rules;

means determining whether any characters remain to which color indicia have not been assigned;

means examining the color indicia bearing characters alone in accordance with said set of syntax rules and designating said statement as acceptable or unacceptable, and, if designated acceptable, entering an altered programming statement thereof into the program formed solely of color indicia bearing characters.

6. Syntax examination and correction means as set forth in claim 5, further including:

first means operative if said statement is designated as unacceptable displaying said statement in a manner wherein all color indicia bearing characters bear a common visual designation.

7. Syntax examination and correction means or set forth in claim 6 wherein the visual designation is a gray shaded background surrounding the character.

8. Syntax examination and correction means as set forth in claim 5 wherein the color indicia is a predetermining color background surrounding the character.

* * * * *